June 14, 1938.  J. W. SHEPERDSON  2,120,473
MANUFACTURE OF BEVELED EDGE STRIP
Filed March 2, 1936  2 Sheets-Sheet 1

INVENTOR
JOHN W. SHEPERDSON
BY Albert G. Blodgett
ATTORNEY

June 14, 1938.    J. W. SHEPERDSON    2,120,473
MANUFACTURE OF BEVELED EDGE STRIP
Filed March 2, 1936    2 Sheets-Sheet 2

INVENTOR
JOHN W. SHEPERDSON
BY *Albert G. Blodgett*
ATTORNEY

Patented June 14, 1938

2,120,473

UNITED STATES PATENT OFFICE 2,120,473

MANUFACTURE OF BEVELED EDGE STRIP

John W. Sheperdson, Worcester, Mass., assignor to Morgan Construction Company, Worcester, Mass., a corporation of Massachusetts Application March 2, 1936, Serial No. 66,590

11 Claims. (Cl. 164—65)

This invention relates to strip manufacture, and more particularly to an improved method and apparatus for manufacturing strip with beveled edges.

In the manufacture of butt welded pipe it is customary to utilize flat metal strips known as "skelp", and it is frequently desirable that the edges of the strips be beveled so that they may be brought into proper contact for the welding operation. Heretofore such skelp has been produced by a hot rolling process in which edging rolls are utilized to form the beveled edges. Since the edging rolls are usually followed by one or more flatting passes which reduce the thickness and tend to distort the edges, it is difficult to obtain the exact shape desired in the finished skelp. Furthermore, in the hot rolling of metal there is always some scale formed on the product, and this scale renders it difficult to secure proper welds.

It is accordingly one object of the invention to provide a comparatively simple and inexpensive method and apparatus whereby strip may be produced with accurately beveled edges.

It is a further object of the invention to provide a comparatively simple and inexpensive method and apparatus whereby strip may be produced with edges which are beveled and free from scale.

With these and other objects in view, as will be apparent to those skilled in the art, the invention resides in the combination of parts and the steps of the process set forth in the specification and covered by the claims appended hereto.

Referring to the drawings illustrating one embodiment of the invention and in which like reference numerals indicate like parts, Fig. 1 is a somewhat diagrammatic top plan view of one form of apparatus embodying the invention;

Figure 1:
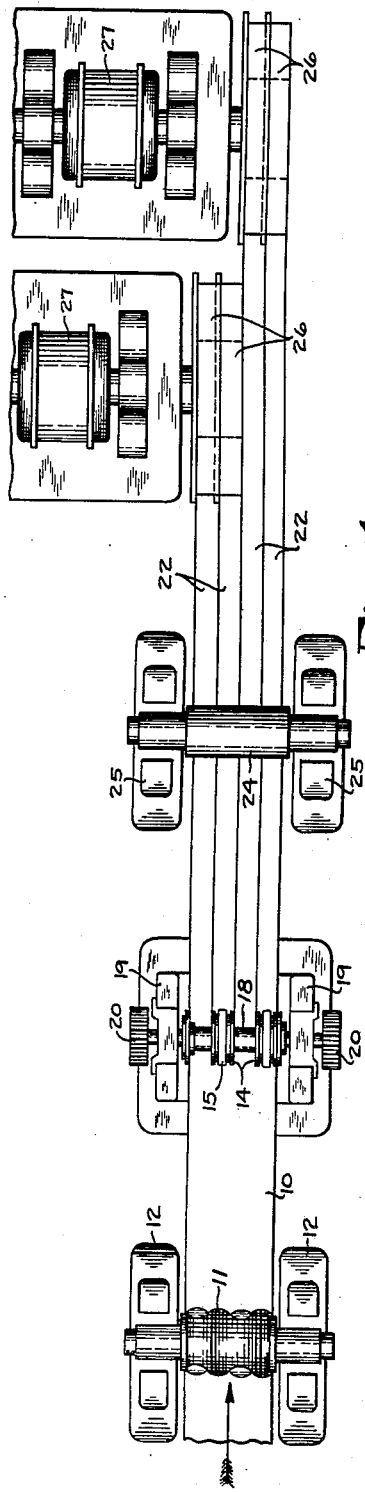

In the manufacture of strip in accordance with the invention, I provide a flat strip of a suitable material, such as rolled steel, and bend the strip transversely through a predetermined angle which is dependent upon the angle desired for the beveled edges. This strip may comprise an elongated sheet 10 of substantial width, and I preferably bend the sheet to form a plurality of longitudinal corrugations therein. For this purpose I prefer to utilize a pair of suitably shaped corrugated rolls 11 between which the sheet 10 is passed. These rolls 11 are shown with their axes horizontal, and they are rotatably supported in housings 12 of well known construction. Any suitable means (not shown) may be provided to drive the rolls.

The corrugated sheet is now sheared longitudinally in parallel planes between the corrugations into a plurality of strips. For this purpose I preferably utilize cooperating rotary shear blades 14. As shown particularly in Fig. 4, the blades 14 may be annular in form and fastened to the sides of hubs 15 which are keyed to a pair of spaced horizontal shafts 16. Sleeves 18 surround the shafts between the hubs to aid in maintaining the hubs properly spaced. The hubs 15 are preferably somewhat larger in diameter than the blades 14 so that the hubs will engage the concave surfaces of the stock, thus tending to prevent distortion of the stock by reason of the shearing pressure. The shafts 16 are mounted in suitable housings 19 (Figs. 1 and 2), and the shafts are connected at their ends by gears 20. Any suitable means (not shown) may be provided to drive the shafts.

Figure 4:
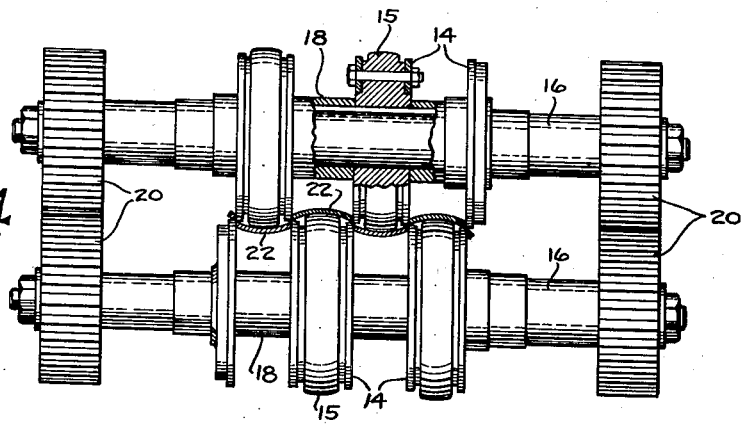
Fig. 4 is a section on the line 4—4 of Fig. 2.
Figure 5:
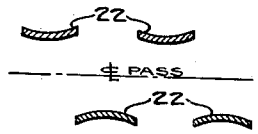
Fig. 5 is a section on the line 5—5 of Fig. 2.

It will now be apparent from Fig. 4 that the blades 14 will trim the edges of the sheet 10 and at the same time shear the sheet longitudinally into a plurality of strips 22 each of which is arcuate in cross-section and provided with plane vertical surfaces at its edges. Furthermore, laterally adjacent strips will be curved in opposite directions, some of the strips having their concave surfaces uppermost and the others having their convex surfaces uppermost. In the embodiment illustrated four of the strips 22 are shown, but the number of strips may be varied as desired.

Figure 6:
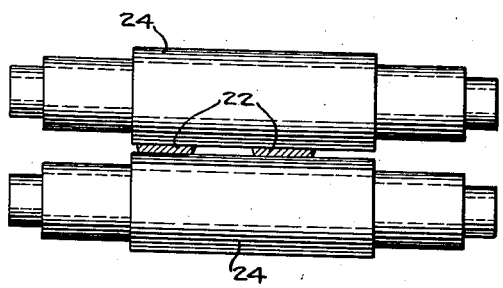
Fig. 6 is a section on the line 6—6 of Fig. 2.

The strips 22 delivered by the shearing mechanism are now preferably flattened, and for this purpose I have shown two pairs of horizontal rolls 24 arranged with their axes in a single vertical plane. These rolls are mounted in housings 25, and the rolls may be driven by any suitable means (not shown). The strips 22 having their concave surfaces uppermost are passed between the upper pair of rolls 24, and the remaining strips are passed between the lower pair of rolls 24. As indicated in Fig. 6, after leaving the rolls 24 the strips 22 will be substantially flat and their edges will be beveled in opposite directions, so that the strips may be used as skelp in the manufacture of pipe.

Figure 2:
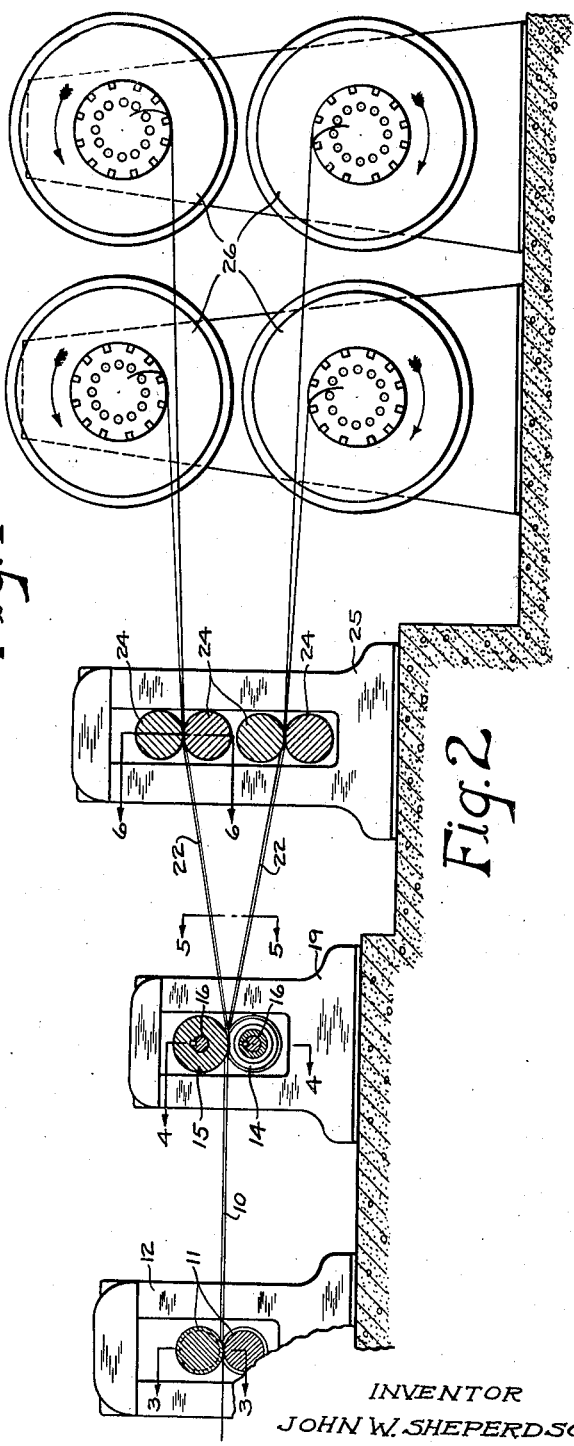
Fig. 2 is a longitudinal section through the apparatus shown in Fig. 1.
Figure 3:
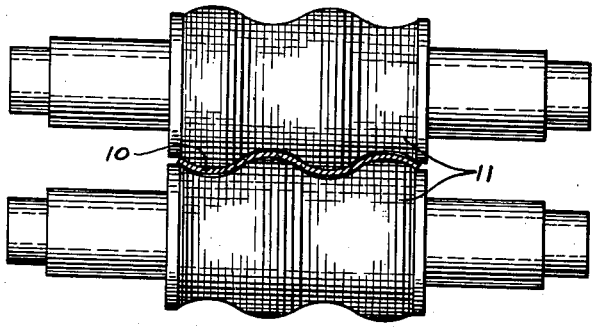
Fig. 3 is a section on the line 3—3 of Fig. 2.

In order to facilitate handling of the strips it is desirable to form them into coils. Furthermore it is desirable that all the coils be of the same hand, to avoid the confusion and the possibility of errors arising from the formation of right and left hand coils. For the purpose of attaining the desired identity of hand, I prefer to coil alternate strips in one direction, and the remaining strips in the opposite direction. In forming the coils in this manner it is immaterial whether the wide face or the narrow face of the strip be on the inside, so long as all the coils are alike. In the preferred arrangement of apparatus there is provided a plurality of reels 26, one for each strip 22. These reels are arranged in pairs, with one reel in each pair above the other, the reels in each pair being rotated about horizontal axes by an electric motor 27. The reels are offset from each other laterally, as shown in Fig. 1, to bring them into proper alignment with their respective strips 22. As indicated in Fig. 2, the upper reels receive the strips from the upper pair of rolls 24 and rotate in a counter-clockwise direction, while the lower reels receive the strips from the lower pair of rolls 24 and rotate in a clockwise direction.

The operation of the invention will now be apparent from the above disclosure. The sheet 10 is passed between the corrugating rolls 11, which form longitudinal corrugations in the sheet. The sheet is next trimmed at its edges and sheared longitudinally between the corrugations by the revolving blades 14, forming a plurality of arcuate strips 22. These strips are then flattened by the rolls 24 and coiled by the reels 26. It will be understood that the width of the corrugations formed in the sheet will depend upon the width desired in the finished skelp, and the depth of the corrugations will depend upon the amount of bevel desired for the edges of the finished skelp, since the angle of bevel is determined by the lateral inclination of the stock at the point where the shearing occurs between corrugations.

The invention makes it possible to produce skelp of any desired width with accurately beveled edges of any desired angle. Moreover the process can be carried out with cold stock, so that the edges will be free from scale. The apparatus disclosed is comparatively simple and inexpensive.

Having thus described my invention, what I claim as new and desire to secure by Letters Patent is:

1. The method of manufacturing beveled edge strip comprising the steps of moving a flat strip of material longitudinally, bending the strip transversely through a predetermined angle without interrupting its longitudinal movement, and shearing the edges of the strip in parallel planes while the strip is bent and without interrupting its longitudinal movement.

2. The method of manufacturing beveled edge strip comprising the steps of bending an elongated flat sheet of material transversely to form a plurality of longitudinal corrugations therein, and shearing the sheet longitudinally between the corrugations into a plurality of strips.

3. The method of manufacturing beveled edge strip comprising the steps of bending an elongated flat sheet of material transversely to form a plurality of longitudinal corrugations therein, and shearing the sheet in parallel planes between the corrugations into a plurality of strips.

4. The method of manufacturing beveled edge strip comprising the steps of bending an elongated flat sheet of material transversely to form a plurality of longitudinal corrugations therein, shearing the sheet in parallel planes between the corrugations into a plurality of strips, and flattening the strips.

5. The method of manufacturing beveled edge strip comprising the steps of bending an elongated flat sheet of material transversely to form a plurality of longitudinal corrugations therein, shearing the sheet in parallel planes between the corrugations into a plurality of strips, coiling alternate strips in one direction, and coiling the remaining strips in the opposite direction.

6. Apparatus for manufacturing beveled edge strip comprising means to bend a flat strip of material transversely through a predetermined angle, and means to shear the edges of the strip in parallel planes while the strip is bent.

7. Apparatus for manufacturing beveled edge strip comprising means to bend a longitudinally moving flat strip of material transversely through a predetermined angle without interrupting its longitudinal movement, and means to shear the edges of the strip in parallel planes while the strip is bent and without interrupting its longitudinal movement.

8. Apparatus for manufacturing beveled edge strip comprising means to bend a flat strip of material transversely through a predetermined angle, means to shear the edges of the strip in parallel planes while the strip is bent, and means to flatten the sheared strip.

9. Apparatus for manufacturing beveled edge strip comprising means to bend an elongated flat sheet of material transversely and form a plurality of longitudinal corrugations therein, and means to shear the sheet in parallel planes between the corrugations into a plurality of strips.

10. Apparatus for manufacturing beveled edge strip comprising a pair of rolls shaped to form a plurality of longitudinal corrugations in an elongated sheet of material, and rotatable shear blades arranged to shear the sheet in parallel planes between the corrugations into a plurality of strips.

11. Apparatus for manufacturing beveled edge strip comprising means to bend an elongated flat sheet of material transversely and form a plurality of longitudinal corrugations therein, means to shear the sheet in parallel planes between the corrugations into a plurality of strips, and a separate rotatable reel for each strip, the reels which correspond to laterally adjacent strips being arranged to rotate in opposite directions.

JOHN W. SHEPERDSON.